Patented May 21, 1929.

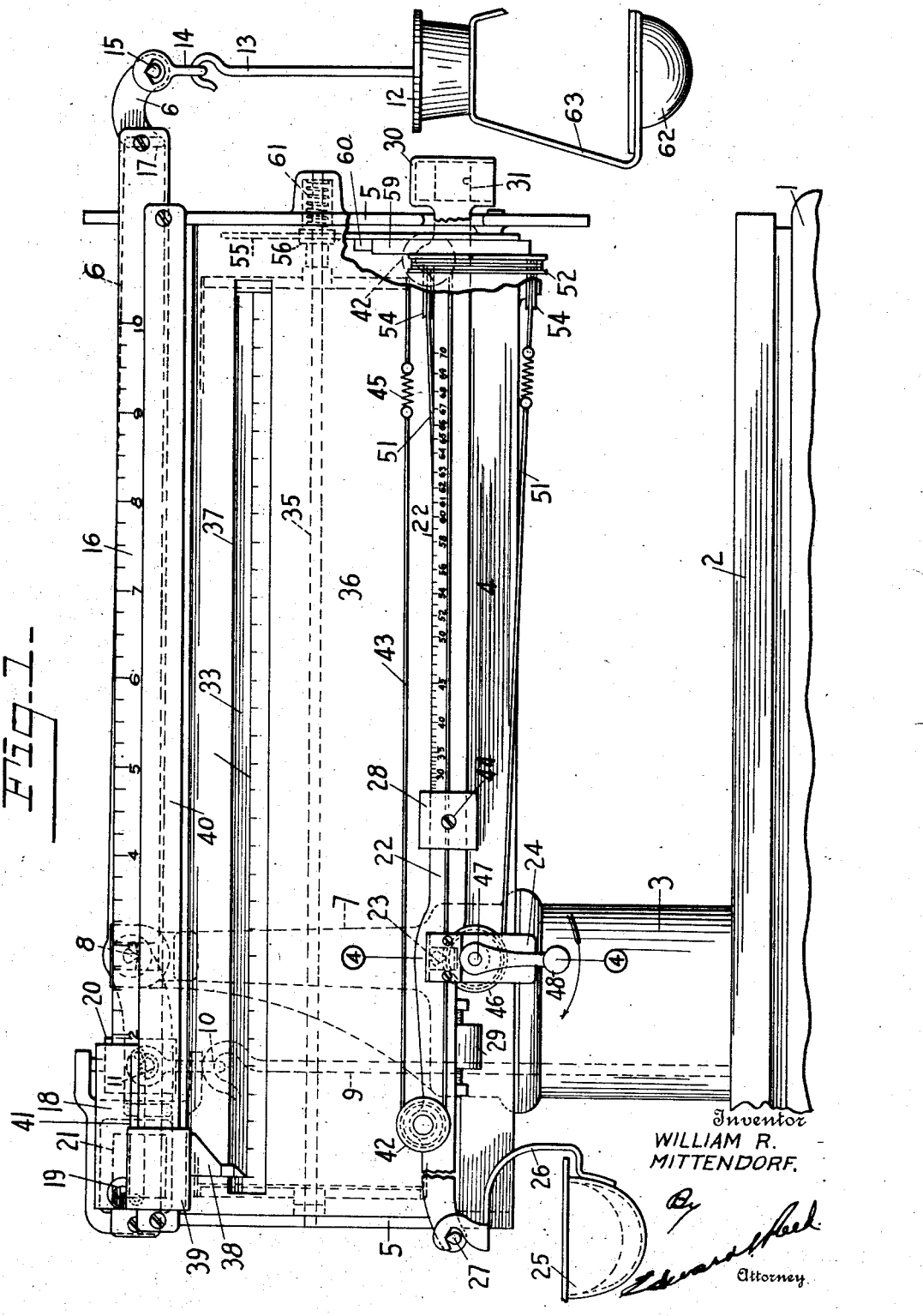

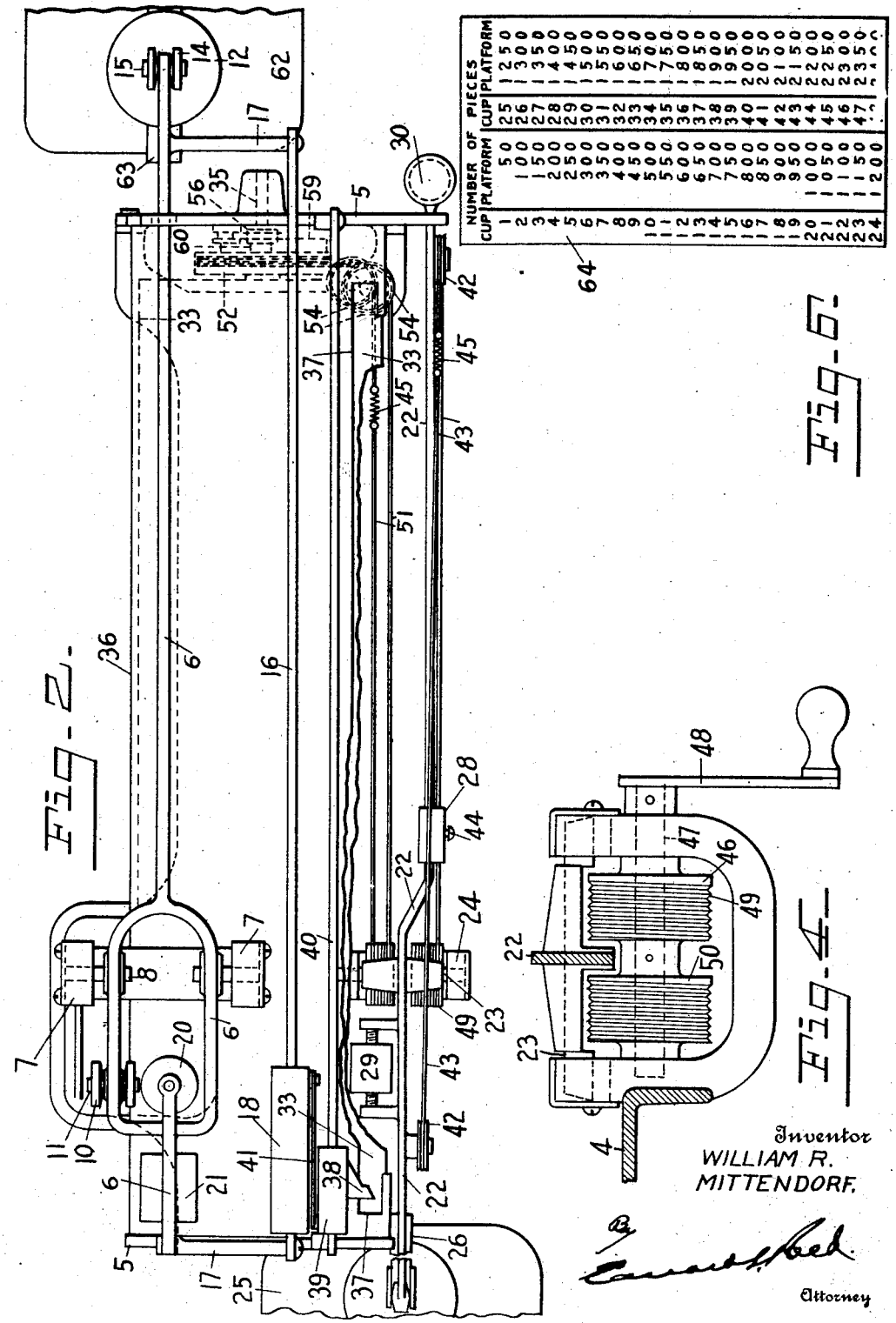

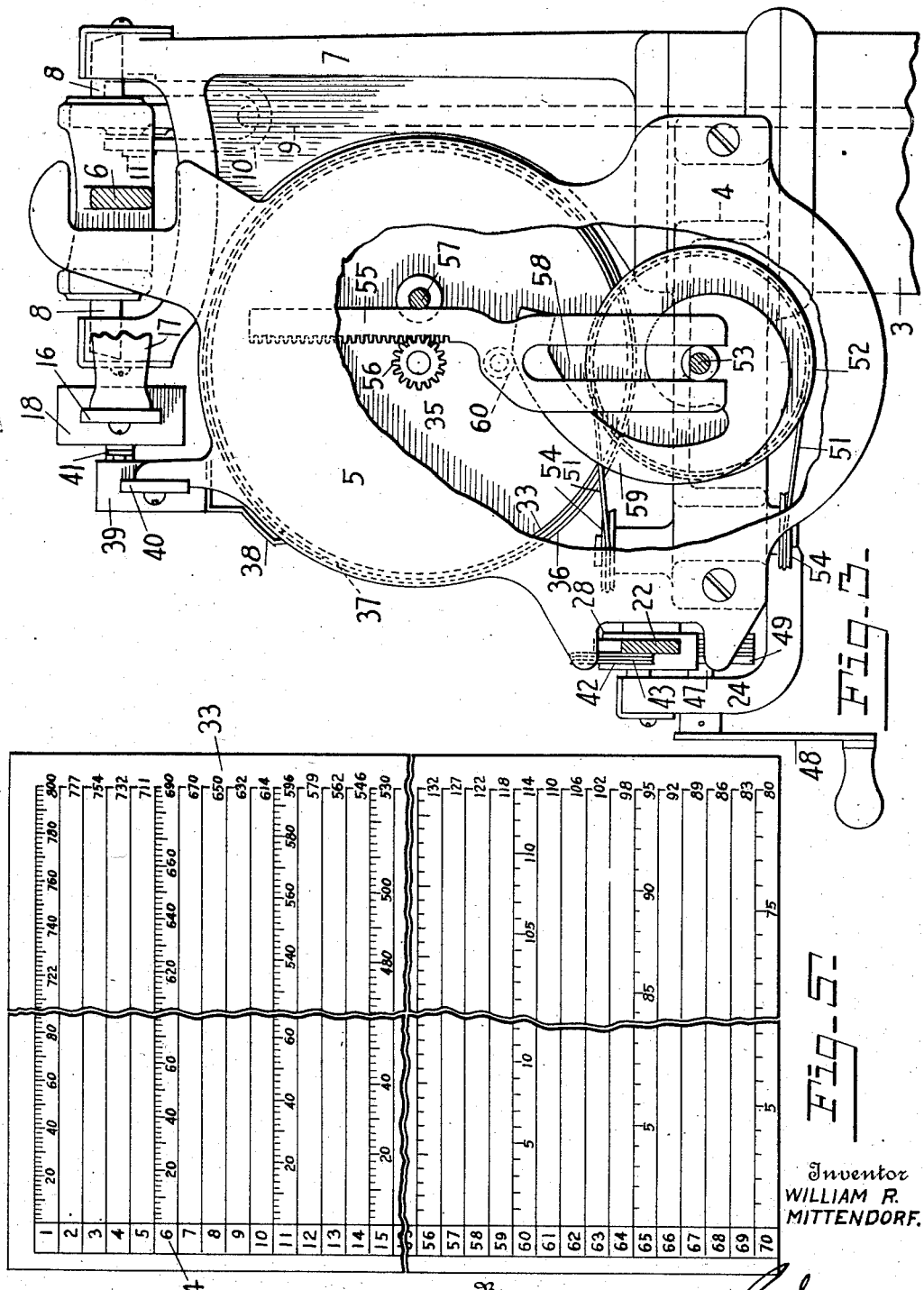

1,713,774

UNITED STATES PATENT OFFICE.

WILLIAM R. MITTENDORF, OF CINCINNATI, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK.

COMPUTING SCALE.

Application filed October 22, 1923. Serial No. 670,195.

This invention relates to computing scales and more particularly to a counting scale.

One object of the invention is to provide a portable counting scale of the index number type, that is, a scale comprising a chart having a plurality of series of graduations representing numbers of parts which are designated by index numbers and with which cooperates an indicating member controlled by the load on the scale.

A further object of the invention is to provide a beam scale of the index number type.

A further object of the invention is to provide a scale in which a chart having a plurality of series of graduations will be adjusted under the control of the unit balance to bring that series of graduations corresponding to the weight of the unit into operative relation to an indicating member the movement of which is controlled by the load balance.

A further object of the invention is to so construct and arrange the mechanism of such a scale that only one series of graduations on the chart will be visible at any one time, thus facilitating the accurate reading of the computation.

A further object of the invention is to provide a scale of this type which will calculate any number of parts of an unknown quantity within the capacity of the scale and which may be used to make up lots of parts of any predetermined quantity within the capacity of the scale.

A further object of the invention is to provide a scale of this type which will indicate the number of parts in the lot and the weight of the lot simultaneously.

Other objects of the invention will appear as the device is described in detail.

In the accompanying drawings Fig. 1 is a front elevation, partly broken away, of a scale embodying my invention; Fig. 2 is a top plan view of the same; Fig. 3 is an end elevation thereof, partly broken away; Fig. 4 is a section taken on the line 4—4 of Fig. 1; Fig. 5 is a detail view of the chart in flat form, partly broken away; and Fig. 6 is a facsimile of the wall chart.

In these drawings I have illustrated one embodiment of my invention but it will be understood that this has been chosen for the purposes of illustration only and that the invention, or selected features thereof, may be embodied in scales of various kinds; and further, that the mechanism may take various forms without departing from the spirit of the invention.

In carrying out my invention I have embodied the same in a scale comprising a load balance and a unit balance each comprising a beam and a poise adjustable relatively thereto. In the present construction the two balances are entirely separate one from the other and the beams are mounted for movement about separate axes but this is not essential to the operation of the device, it being only necessary that the construction be such that the load, or mass of parts, and the unit upon which the computation is based may be separately balanced. Associated with these balances is a chart having thereon a plurality of series of graduations, each graduation representing a number of parts and the computations of the several series of graduations being based upon units of different weights. This chart is adjustable under the control of the unit balance to cause that series of graduations corresponding to the weight of the unit on the unit balance to be brought into cooperative relation with an indicating member which is moved along that series of graduations under the control of the load balance.

The mechanism of the device may take various forms but I have here shown one form which is well adapted to accomplish the desired results.

In that particular embodiment of the invention here shown the scale comprises a base 1 having a load platform 2 and an upright standard 3. Rigidly secured to the upper end of the standard 3 is a substantially horizontal bracket 4 which constitutes a supporting frame for the mechanism. This bracket is provided at its ends with end plates 5 which are rigidly secured thereto and which form in effect a part of the frame.

The load balance comprises a beam 6 which is pivotally mounted between its ends upon a bracket or standard 7 extending upwardly from the bracket 4. As here shown, the beam has mounted therein knife edge pivots 8 which engage the usual V bearings carried by the bracket 7. At one side of its axis, the left hand side in Fig. 1, the beam is pivotally connected with a draft rod 9 which is connected with the platform 2, either directly or through suitable intermediate mechanism, and which has a hook which engages a stirrup 10 having in its arms bearings which are supported by knife edge pivots 11 mounted in the beam. On the other side of its axis, and at the right hand end of the beam as shown in Fig. 1, the beam is provided with a counterpoise 12 which is also adapted to receive loose weights when these are required. As here shown, the stem 13 of the counterpoise has a hook which engages a stirrup 14 supported by knife edge pivots 15 mounted in the end portion of the beam. Rigidly secured to the beam 6 and forming in effect a part thereof is a bar 16, extending parallel with the beam 6 and rigidly secured at its ends thereto by means of arms or brackets 17. This bar forms a support upon which a poise 18 is slidably mounted and the bar is preferably graduated in pounds and fractions thereof and the poise is provided with a reading opening and pointer, as shown at 19, whereby the weight of the load may be determined. The beam is also provided with balancing weights 20 and 21 by means of which the seal or zero balance of the scale may be established. If desired, the load balance may be provided with a tare beam in the usual manner but this is not here shown.

The unit balance comprises a beam 22 which is pivotally mounted between its ends and, as here shown, is provided with knife edge pivots 23 which engage the usual V bearings in the arms of a bracket 24 rigidly secured to the main frame or bracket 4. At one end, the left hand end in Fig. 1, the beam supports a unit receptacle 25 which is here shown as carried by a holder 26 having hook shaped portions supported by knife edge pivots 27 mounted in the beam. Slidably mounted on the beam is a poise 28 which serves to balance the weight of the unit in the unit receptacle. The beam is provided with weights 29 and 30 by means of which the seal or zero balance of the unit balance mechanism may be established. As here shown, the weights are arranged on opposite sides of the axis of the beam and the weight 29 is adjustable lengthwise of the beam while the weight 30 is provided with a screw threaded plug 31 adjustable transversely of the beam in a vertical direction. It will be obvious, however, that the weights may be arranged in any suitable manner.

As has been stated the indicating members comprise a chart the position of which is controlled by the unit balance and an indicating member adapted to move over the chart under the control of the load balance. The chart, which is shown at 33, comprises a plurality of series of graduations arranged in parallel lines, the graduations of each series being arranged and numbered to represent numbers of parts based upon units of different weights. These several series of graduations may, if desired, be provided with index numbers 34. In the present instance, there are seventy series of graduations and the index numbers run from 1 to 70. Preferably the index numbers are of a color different than the color of the graduations and the numerals associated therewith so as to be readily distinguished therefrom. The chart may be movably mounted in any suitable manner but I prefer to construct the same in the form of a cylinder with the several series of graduations extending parallel with the axis thereof. As here shown, the cylindrical chart is rigidly mounted on a shaft 35 which is journaled at its ends in the end plates 5 of the supporting frame. The cylinder is preferably enclosed in a housing 36 which is provided with a reading opening 37 extending lengthwise thereof and of such width that only one series of graduations will be fully exposed by said opening at any one time. The chart is adjusted under the control of the unit balance to bring into line with the reading opening 37 the particular series of graduations which corresponds to the weight of the unit in the unit receptacle. The load balance has associated therewith an indicating member adapted to travel along the reading opening and over the exposed series of graduations and to be positioned with relation thereto according to the weight of the load on the load balance. This indicating member may be associated with the load balance in any suitable manner but inasmuch as the beam of the load balance is subject to vibratory movement I prefer that the indicator shall be mounted independently of the beam so that it will not be affected by these vibratory movements. I have therefore shown the indicating member as a pointer 38 carried by a slide block or carriage 39 mounted upon a bar 40 extending lengthwise of the beam and supported at its ends by the end members 5 of the main frame. The carriage or supporting block for the indicator is connected with the poise of the load balance by means of a link 41 which is pivotally connected at its respective ends with the carriage and the poise, so that the movements of the poise lengthwise of the beam will be directly transmitted to the indicating member but the poise can move vertically when the beam vibrates without affecting the position of the indicating member.

The means for adjusting the chart under the control of the unit balance may take various forms but I have, in the present instance, shown the same as operatively connected with the poise 28 of the unit balance through the medium of a common actuating device. The beam 22 of the unit balance has mounted thereon, on opposite sides of its axis, pulleys 42 which are preferably mounted on horizontal axes and about which extends an endless flexible member 43 which is rigidly connected with the poise 28. In the present instance, the poise is provided with an opening through which the flexible member extends and in which it is secured by a set screw 44. If desired, a coiled spring 45 may be interposed in the flexible member to hold the same taut. One stretch of the endless flexible member, preferably the lower stretch thereof, extends about a drum 46 which is mounted on a shaft 47 journaled in the arms of the bracket 24 and which is provided with an operating handle or crank 48. The cable or flexible member preferably has a plurality of windings extending about the drum and may, if desired, be provided with spiral grooves, as shown at 49, to separate and guide the several windings of the cable. The cable may be rigidly secured to the drum in any suitable manner. The axis of the drum is preferably arranged directly beneath the axis of the beam 22 and is spaced from the axis of the beam a distance equal to the radius of the drum so that the flexible member or cable, which extends horizontally from the drum, will have tangential contact with the drum at a point in line with the axis of the beam. By thus mounting the actuating member for movement about the axis of the beam the movement of the beam will not in any way be effected by the actuating device for the poise and this actuating device will not interfere with the balance of the beam. The actuating device for the poise is so connected with the cylindrical chart that movement will be imparted to the chart in an amount directly proportionate to the movement of the poise 28. In the present construction the drum 49 is provided with a portion 50 rigidly secured thereto, constituting a part thereof and of the same character and diameter as the drum 49. An endless flexible member or cable 51 extends about this second portion of the drum and about a drum or pulley 52 mounted on a shaft 53 supported by the bracket 4 and adjacent end plate 5. Inasmuch as the axis of the drum 52 is transverse to the axis of the drum 49—50 I have passed the respective stretches of the cable or endless member about guide pulleys 54 which properly position and guide the same with relation to the drum 52. The cable 51 is given a sufficient number of windings about the respective drums to cause the same to rotate therewith and may, if desired, be rigidly secured thereto in any suitable manner. Movement is transmitted from the pulley or drum 52 to the cylindrical chart 53 by means of a vertically movable rack bar 55 the teeth of which mesh with a pinion 56 rigidly secured to the shaft 35 of the chart, and which is held in mesh with said pinion by means of a projection or stud 57 carried by the end plate 5. The lower portion of the rack bar 55 is slotted, as shown at 58, to receive the shaft 53 and the hub of the drum 52, which serves to guide the rack bar in a vertical line. Rigidly secured to the shaft 53 is a cam 59 the operative edge of which contacts with a stud or roller 60 rigidly secured to the rack bar 57. A spring 61 acts on the pinion 56 to hold the stud 60 on the rack bar constantly in contact with the cam and to restore the chart to its initial position when the cam is moved in a reverse direction. In the present construction the beam 22 is provided with graduations and index numbers corresponding to the index numbers on the chart and it will be apparent that as the poise is moved along the beam 22 by the action of the operating handle 48, the chart will be rotated to a corresponding extent so that the index number of the series of graduations which is exposed through the reading opening will always correspond to the index number on the beam which is indicaed by the poise 28.

In the operation of the device, when it is desired to determine the number of parts contained in a mass of unknown quantity, the mass is placed upon the load platform 2 and the poise 18 adjusted by hand to a position in which it will counterbalance the load on the platform, that is, until a state of equilibrium has been established in the load balance, this adjustment of the poise serving to move the indicating member 38 to a position corresponding to the weight of the load. The poise of the unit balance is then moved to its extreme left hand position, as shown in Fig. 1, and a unit of the parts to be counted is then placed in the unit receptacle 25. This unit preferably consists of a single piece and if this piece is sufficiently heavy to overbalance the beam 22, and move the right hand end thereof upward, the operating handle 48 is actuated to move the poise 28 to the right a distance sufficient to balance the weight of the unit in the unit receptacle 25 and thereby establish a state of equilibrium in the unit balance. The operation of the actuating device to impart this movement to the poise 28 will rotate the cylindrical chart a distance sufficient to bring into line with the reading opening 37 that series of graduations corresponding to the weight of the unit, as indicated by the index numbers on the chart and on the unit beam respectively. The chart having been thus adjusted according to the weight of a unit and the indicating member 38 having been adjusted according to the weight of the mass of parts to be counted, that graduation on the chart which is indicated by the member 38 will represent the number of parts in the lot on the load platform. If a unit consisting of a single part, when placed in the unit receptacle 25, is not sufficiently heavy to overbalance the lever 26 additional parts must be added thereto and the number indicated on the chart by the indicating member 38 multiplied by the number of parts which have been placed in the unit receptacle. When it is necessary to increase the number of parts in the unit the number is preferably increased to 10 so that the multiplication may be easily effected and there will be little likelihood of error.

Means are also provided for counting the number of parts in a mass which is greater than the capacity of the beam 6, which is indicated by the failure of the beam to move downwardly when the poise 18 is moved to its extreme right hand position. To count such a mass I have provided the beam 6 with a unit receptacle 62 which, in the present instance, is carried by a holder 63 secured to the counterpoise 12. When the weight of the mass is such that the poise 18 will not move the lever or beam downwardly a number of the parts to be counted are dropped into the unit receptacle 66, which has a fixed ratio with relation to the load platform 2, until the weight in the unit receptacle is sufficient to move the beam to its lowermost position. The poise 18 is then moved to the left a distance sufficient to balance the beam 6. Thereafter the unit balance is operated in the manner above described and a reading taken from the chart 33. This reading will represent the number of parts in the mass which are counterbalanced by the poise 18 on the beam 6. The remainder of the mass of parts is counterbalanced by the parts in the fixed ratio unit receptacle 62 and the number of parts in this portion of the mass is determined by multiplying the number of parts in the fixed ratio unit receptacle by the number representing the ratio between that unit receptacle and the load platform, which may be 50 to 1, or any other suitable ratio. For convenience of computation I prefer to provide a wall chart, as shown at 64 in Fig. 6, upon which is shown the number of parts on the load platform which will be balanced by a given number of parts in the fixed ratio unit receptacle. The sum of the numbers of parts in the two portions of the load will represent the total number of parts in the load.

If it is desired to count out a certain predetermined number of parts one of the parts to be counted is placed in the unit receptacle 25 and the actuating device is operated until the beam 22 of the unit balance is in a state of equilibrium. The poise 18 of the load balance is then moved to the right until the indicating member 38 registers with the number, on the series of graduations which is exposed at the reading opening 37, which corresponds to the number of parts which is desired and the parts are then placed upon the load platform until the beam 6 comes to a balance. The number of parts thus placed on the load platform will be the desired number.

Inasmuch as the computing chart 33 is automatically positioned under the control of the unit balance it is not essential to the operation of the scale that the index numbers on the beam of the unit balance and on the chart should be used as the chart will be correctly positioned without reference to these numbers. There are certain advantages, however, in using the index numbers and I prefer to apply them to the unit beam and the chart. One of the principal advantages is that when the index number of a unit which is frequently used has once been determined it is not necessary in subsequent operations involving that unit to place a unit in the unit receptacle and balance the beam 22 but it is only necessary to move the poise 28 to a position which will indicate the index number of that unit and the computing chart will be accurately positioned according to the weight of the unit.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a counting scale, a load balance, and a unit balance, each comprising a beam and a separately adjustable poise therefor, a chart having a plurality of series of graduations representing numbers of parts, an indicating member to cooperate with said chart, and means controlled by the adjustment of said poises to cause said indicating member to register with a selected series of graduations on said chart and to indicate in said series of graduations that graduation which represents the number of parts on the load platform of said load balance.

2. In a scale, a load balance comprising a beam and a poise therefor, a unit balance comprising a beam and a poise therefor, said beams being separately mounted and said poises being separately adjustable with relation to the respective beams, a chart having a plurality of series of graduations representing numbers of parts, an indicating member to cooperate with said chart, and means controlled by the adjustment of said poises to cause said indicating member to register with a selected series of graduations on said chart and to indicate on said series of graduations that graduation which represents the number of parts on the load platform of said load balance.

3. In a counting scale, a load balance and a unit balance, each comprising a beam and a separately adjustable poise therefor, a movable chart having a plurality of series of graduations representing numbers of parts, an indicating member to cooperate with said chart, means controlled by one of said balances to actuate said chart to move one of said series of graduations into cooperative relation to said indicating member, and means controlled by the other balance to move said indicating member relatively to said series of graduations.

4. In a counting scale, a load balance and a unit balance, each comprising a beam and a separately adjustable poise therefor, a movable chart having a plurality of series of graduations representing numbers of parts, an indicating member to cooperate with said chart, means controlled by said unit balance to actuate said chart to move one of said series of graduations into cooperative relation with said indicating member, and means controlled by said load balance to move said indicating member relatively to said series of graduations.

5. In a counting scale, a load balance and a unit balance, each comprising a beam and a separately adjustable poise therefor, a chart having a plurality of series of graduations representing numbers of parts, an indicating member to cooperate with said chart, an operative connection between the poise of said unit balance and said chart to cause a series of graduations corresponding to the position of said poise to be moved into cooperative relation to said indicating member, and a connection between the poise of said load balance and said indicating member to adjust said indicating member relatively to said series of graduations.

6. In a scale, a load balance comprising a beam and a poise therefor, a unit balance comprising a beam and a poise therefor, said beams being separately mounted and said poises being separately adjustable with relation to the respective beams, a chart having a plurality of series of graduations representing numbers of parts, an indicating member to cooperate with said chart, an operative connection between the poise of said unit balance and said chart to cause the series of graduations on said chart corresponding to the positon of said poise to be moved into cooperative relation to said indicating member, and an operative connection between the poise of said load balance and said indicating member to adjust said indicating member relatively to said series of graduations.

7. In a counting scale, a chart having a plurality of series of graduations representing numbers of parts, an indicating member to cooperate with said chart, said chart being adjustable to bring a selected series of graduations into cooperative relation to said indicating member, a unit balance having means to adjust said chart according to the weight of a unit, a load balance having means to adjust said indicating member along the selected series of graduations according to the weight of the load on said load balance.

8. In a counting scale, a chart having a plurality of series of graduations representing numbers of parts, an indicating member to cooperate with said chart, said chart being adjustable to bring a selected series of graduations into cooperative relation to said indicating member, an actuating device for said chart, a unit balance operatively connected with said actuating device to cause the latter to move said chart into a position in which a series of graduations corresponding to the weight of the unit will register with said indicating member, and a load balance having means to adjust said indicating member along the selected series of graduations according to the weight of the load on said load balance.

9. In a counting scale, a chart having a plurality of series of graduations representing numbers of parts, an indicating member to cooperate with said chart, said chart being adjustable to bring a selected series of graduations into cooperative relation to said indicating member, a unit balance comprising a beam and a poise adjustable relatively thereto, an actuating device operatively connected with said poise, means operated by said actuating device to adjust said chart to a position corresponding to the position of said poise, and a load balance having means to adjust said indicating member according to the weight of the the load on said load balance.

10. In a counting scale, a chart having a plurality of series of graduations representing numbers of parts, an indicating member to cooperate with said chart, said chart being adjustable to bring a selected series of graduations into cooperative relation to said indicating member, mechanism comprising a cam for imparting movement to said chart, a unit balance comprising a beam, and a poise adjustable relatively thereto, an actuating device operatively connected with said poise and with the mechanism for actuating said chart, and a load balance having means to adjust said indicating member according to the weight of the load on said load balance.

11. In a counting scale, a rotatable chart having a plurality of series of graduations representing numbers of parts, an indicating member mounted for movement lengthwise of said series of graduations, a unit balance, an operative connection between said unit balance and said chart to cause the latter to be rotated to bring into operative relation with said indicating member the series of graduations corresponding to the weight of a unit, and a load balance having means to adjust said indicating member according to the weight of the load on said load balance.

12. In a counting scale, a rotatable chart having a plurality of series of graduations representing numbers of parts, an indicating member mounted for movement lengthwise of said series of graduations, means for imparting rotary movement to said chart, a unit balance comprising a beam and a poise adjustable relatively thereto, an actuating device so connected with said poise and the means for rotating said chart that said chart will be rotated a distance proportionate to the movement of said poise, and a load balance having means to adjust said indicating member according to the weight of the load on said load balance.

13. In a counting scale, a rotatable chart having a plurality of series of graduations representing numbers of parts, an indicating member mounted for movement lengthwise of said series of graduations, a unit balance comprising a beam and a poise adjustable relatively thereto, means for adjusting said poise relatively to said beam, said adjusting means comprising a part movable about the axis of said beam, an operative connection between said adjusting means and said chart, and a load balance having means to adjust said indicating member according to the weight of the load on said load balance.

14. In a counting scale, a rotatable chart having a plurality of series of graduations representing numbers of parts, an indicating member mounted for movement lengthwise of said series of graduations, a unit balance comprising a beam and a poise adjustable relatively to said beam, a drum mounted independently of said unit balance adjacent to the fulcrum thereof, a flexible member mounted on said beam, connected with said poise and having tangential contact with said drum in line with the axis of said beam, means for operatively connecting said drum with said chart, and a load balance having means to adjust said indicating member according to the weight of the load on said load balance.

15. In a counting scale, a rotatable chart having a plurality of series of graduations representing numbers of parts, an indicating member mounted for movement lengthwise of said series of graduations, a unit balance comprising a beam and a poise adjustable relatively to said beam, a drum mounted independently of said balance adjacent to the fulcrum of said beam, guides mounted on said beam on opposite sides of the axis thereof, an endless flexible member extending about said guides, connected with said poise, and wound about said drum, said member having tangential contact with said drum at a point substantially in line with the axis of said beam, means for operatively connecting said drum with said chart, and a load balance having means to adjust said indicating member according to the weight of the load on said load balance.

16. In a counting scale, a rotatable chart having a plurality of series of graduations representing numbers of parts, an indicating member mounted for movement lengthwise of said series of graduations, a unit balance comprising a beam and a poise adjustable relatively to said beam, a drum mounted independently of said balance adjacent to the fulcrum of said beam, guides mounted on said beam on opposite sides of the axis thereof, an endless flexible member extending about said guides, connected with said poise and wound about said drum, said member having tangential contact with said drum at a point substantially in line with the axis of said beam, mechanism for imparting rotary movement to said chart, a second flexible member connecting said drum with said mechanism, and a load balance having means to adjust said indicating member according to the weight of a load on said load balance.

17. In a counting scale, a rotatable chart having a plurality of series of graduations representing numbers of parts, an indicating member mounted for movement lengthwise of said series of graduations, a unit balance comprising a beam and a poise adjustable relatively to said beam, a drum mounted independently of said balance adjacent to the fulcrum of said beam, guides mounted on said beam on opposite sides of the axis thereof, an endless flexible member extending about said guides, connected with said poise, and wound about said drum, said member having tangential contact with said drum at a point substantially in line with the axis of said beam, a reciprocatory member for imparting rotary movement to said chart, means for actuating said reciprocatory member, an operative connection between said actuating means and said drum, and a load balance having means to adjust said indicating member according to the weight of a load on said load balance.

18. In a counting scale, a rotatable chart having a plurality of series of graduations representing number of parts, an indicating member mounted for movement lengthwise of said series of graduations, a unit balance comprising a beam and a poise adjustable relatively to said beam, a drum mounted independently of said balance adjacent to the fulcrum of said beam, guides mounted on said beam on opposite sides of the axis thereof, an endless flexible member extending about said guides, connected with said poise and wound about said drum, said member having tangential contact with said drum at a point substantially in line with the axis of said beam, a reciprocatory member for imparting rotary movement to said chart, means for actuating said reciprocatory member, a drum connected with said actuating means, an endless flexible member connecting the last mentioned drum with the first mentioned drum, and a load balance having means to adjust said indicating member according to the weight of the load on said load balance.

19. In a counting scale, a rotatable chart having a plurality of series of graduations representing numbers of parts, an indicating member mounted for movement lengthwise of said series of graduations, a unit balance comprising a beam and a poise adjustable relatively to said beam, a drum mounted independently of said balance adjacent to the fulcrum of said beam, guides mounted on said beam on opposite sides of the axis thereof, an endless flexible member extending about said guides, connected with said poise and wound about said drum, said member having tangential contact with said drum at a point substantially in line with the axis of said beam, mechanism comprising a cam to impart rotary movement to said chart, a drum connected with said cam, an endless flexible member connecting the last mentioned drum with the first mentioned drum, and a load balance having means to adjust said indicating member according to the weight of the load on said load balance.

20. In a counting scale, a cylindrical chart rotatable about a longitudinal axis and having a plurality of series of graduations representing numbers of parts, each series of graduations extending lengthwise of said chart, an indicating member to cooperate with said chart and mounted for movement lengthwise of said chart, a unit balance, means controlled by said unit balance to rotate said chart to position a series of graduations corresponding to the weight of a unit adjacent to the line of movement of said indicating member, and a load balance having means to adjust said indicating member according to the weight of a load on said load balance.

21. In a counting scale, a cylindrical chart rotatable about a longitudinal axis and having a plurality of series of graduations representing numbers of parts, each series of graduations extending lengthwise of said chart, an indicating member to cooperate with said chart and mounted for movement lengthwise of said chart, a unit balance comprising a beam and a poise adjustable relatively to said beam, means controlled by the movement of said poise for moving said chart about its axis, and a load balance having means for adjusting said indicating member according to the weight of a load on said load balance.

22. In a counting scale, a cylindrical chart rotatable about a longitudinal axis and having a plurality of series of graduations representing numbers of parts, each series of graduations extending lengthwise of said chart, an indicating member to cooperate with said chart and mounted for movement lengthwise of said chart, a unit balance comprising a beam and a poise adjustable relatively to said beam, an actuating device mounted independently of said unit balance, means for operatively connecting said actuating device with said poise and with said chart, and a load balance having means for adjusting said indicating member according to the weight of a load on said load balance.

23. In a counting scale, a cylindrical chart rotatable about a longitudinal axis and having a plurality of series of graduations representing numbers of parts, each series of graduations extending lengthwise of said chart, an indicating member to cooperate with said chart and mounted for movement lengthwise of said chart, mechanism arranged at one end of said cylindrical chart for imparting rotary movement thereto, a unit balance comprising a beam extending lengthwise of said chart, and a poise adjustable relatively to said beam, and actuating device mounted independently of said unit balance, means for operatively connecting said actuating device with said poise and with the mechanism for rotating said chart, and a load balance having means for adjusting the indicating member according to the weight of the load on said load balance.

24. In a counting scale, a cylindrical chart rotatable about a longitudinal axis and having a plurality of series of graduations representing numbers of parts, each series of graduations extending lengthwise of said chart, an indicating member to cooperate with said chart and mounted for movement lengthwise of said chart, mechanism arranged at one end of said cylindrical chart to impart rotary movement thereto, said mechanism comprising a drum, a unit balance comprising a beam and a poise adjustable relatively to said beam, a drum rotatably mounted independently of said unit balance and adjacent to the fulcrum thereof, guides carried by said beam and arranged on opposite sides of the axis thereof, a flexible member extending about said guides and connected with said poise and the last mentioned drum, said flexible member having tangential contact with said drum at a point in line with the axis of said beam, a second flexible member connected with said last mentioned drum and the drum of the mechanism for rotating said chart, and a load balance having means for adjusting said indicating member according to the weight of the load on said load balance.

25. In a counting scale, a cylindrical chart rotatable about a longitudinal axis and having a plurality of series of graduations representing numbers of parts, each series of graduations extending lengthwise of said chart, an indicating member to cooperate with said chart and mounted for movement lengthwise of said chart, a pinion connected with said chart, a rack bar having teeth meshing with said pinion, a cam for imparting movement to said rack bar, a unit balance comprising a beam and a poise adjustable relatively to said beam, an actuating device mounted independently of said unit balance, means for operatively connecting said actuating device with said poise and with said cam, and a load balance having means for adjusting said indicating member according to the weight of the load on said load balance.

26. In a counting scale, a cylindrical chart rotatable about a longitudinal axis and having a plurality of series of graduations representing numbers of parts, each series of graduations extending lengthwise of said chart, an indicating member to cooperate with said chart and mounted for movement lengthwise of said chart, a pinion connected with said chart, a rack bar having teeth meshing with said pinion, a cam to impart movement to said rack bar, a drum connected with said cam, a unit balance comprising a beam and a poise adjustable relatively to said beam, an actuating device comprising a drum mounted independently of said unit balance, a flexible member carried by said beam and connected with said poise and with the last mentioned drum, said flexible member having tangential contact with said drum substantially in line with the axis of said beam, a second flexible member connecting said last mentioned drum with the first mentioned drum, and a load balance having means for adjusting said indicating member according to the weight of the load on said load balance.

27. In a counting scale, a chart having a plurality of series of graduations representing numbers of parts, an indicating member to cooperate with said chart, said chart being a selected series of graduations into cooperative relation to said indicating member, a unit balance having means to adjust said chart according to the weight of a unit on the unit balance, a load balance comprising a beam and poise adjustable with relation to said beam, and an operative connection between said poise and said indicating member.

28. In a counting scale, a chart having a plurality of series of graduations representing numbers of parts, a load balance comprising a beam and a poise, an indicating member connected with said poise and arranged to cooperate with said chart, a unit balance, means controlled by said unit balance to adjust said chart to bring a selected series of graduations into cooperative relation with said indicating member.

29. In a counting scale, a chart having a plurality of series of graduations representing numbers of parts, a load balance comprising a beam and a poise adjustable relatively to said beam, an indicating member mounted independently of said beam for movement along the series of graduations of said chart, an operative connection between said indicating member and said poise, said chart being adjustable to bring a selected series of graduations into cooperative relation with said indicating member, and a unit balance having means to adjust said chart according to the weight of a unit on said unit balance.

30. In a counting scale, a chart having a plurality of series of graduations representing numbers of parts, a load balance comprising a beam and a poise adjustable with relation to said beam, an indicating member mounted independently of said beam for movement along a series of graduations on said chart, a flexible connection between said indicating member and said poise whereby the position of said indicating member will be controlled by the movement of said poise along said beam but said indicating member will not be affected by the vibratory movement of said poise with said beam, a unit balance, and means controlled by said unit balance to adjust said chart to bring into cooperative relation to said indicating member a series of graduations corresponding to the weight of a unit on said unit balance.

31. In a scale, a load balance comprising a beam and a poise mounted on said beam and adjustable relatively thereto, a chart extending lengthwise of said beam, an indicating member mounted independently of said beam for movement lengthwise thereof along said chart, and a flexible connection between said poise and said indicating member.

32. In a scale, a load balance comprising a beam and a poise adjustable along said beam and movable therewith, a chart having a plurality of series of graduations and adjustable to bring a selected series of graduations into operative position, a guide separate from said beam and said chart, an indicating member mounted on said guide for movement along that series of graduations on said chart which is in operative position, and a connection between said poise and said indicating member to cause the latter to cooperate with said chart to effect a computation based on the positions of said chart and said poise.

33. In a counting scale, a chart having a plurality of series of graduations representing numbers of parts, an indicating member to cooperate with said chart, said chart being adjustable to bring a selected series of graduations into cooperative relation with said indicating member, a unit balance having means to adjust said chart according to the weight of a unit, a load balance comprising a beam and a poise adjustable relatively to said beam, and means controlled by the position of said poise to adjust said indicating member with relation to the selected series of graduations, and a unit receptacle connected with said beam.

34. In a counting scale, a rotatable chart having a plurality of series of graduations representing numbers of parts, an indicating member to cooperate with said chart, said chart being adjustable to bring a selected series of graduations into cooperative relation with said indicating member, a unit balance comprising a beam and a poise adjustable relatively to said beam, means controlled by the position of said poise to adjust said chart to bring into cooperative relation with said indicating member a series of graduations corresponding to the weight of a unit, a load balance comprising a beam and a poise adjustable relatively to said beam, means controlled by the position of the poise of said load balance to adjust said indicating member with relation to said selected series of graduations, and a unit receptacle connected with the beam of said load balance at a fixed distance from its axis.

35. In a counting scale, a chart having a plurality of series of graduations representing numbers of parts, each series of graduations having an index number, an indicating member to cooperate with said chart, said chart being adjustable to bring a selected series of graduations into cooperative relation to said indicating member, a unit balance comprising a beam having index numbers corresponding to the index numbers on said chart and a poise adjustable with relation to said beam, means controlled by the position of said poise to adjust said chart to bring into cooperative relation with said indicating member that series of graduations having an index number corresponding to the index number of said beam which is indicated by said poise, and a load balance having means to adjust said indicating member relatively to said series of graduations.

36. In a counting scale, a movable chart having a plurality of series of graduations significant of the weight of different units, an indicating member to cooperate with said chart, means for operating said chart to select one of said series of graduations according to the weight of a unit and means for positioning said indicating member in relation to said selected series according to the weight of the mass of parts to be counted.

37. In a counting scale, a movable chart having a plurality of series of graduations significant of the weight of different units, an indicating member to cooperate with said chart, means controlled by the weight of a unit to operate said chart to select one of said series of graduations, and means controlled by the weight of the mass of parts to be counted to position said indicating member in relation to said selected series of graduations.

38. In a counting scale, a load balance and a unit balance, each comprising a beam and a separately adjustable poise therefor, a movable chart having a plurality of series of graduations representing numbers of parts, an indicating member to cooperate with said chart, means controlled by said units balance to actuate said chart to move one of said series of graduations into cooperative relation with said indicating member, means controlled by said load balance to move said indicating member relatively to said series of graduations, and a unit receptacle connected with said load balance.

39. In a counting scale, a chart having a plurality of series of graduations representing numbers of parts, an indicating member to cooperate with said chart, said chart being adjustable to bring a selected series of graduations into cooperative relation to said indicating member, a unit balance having means to adjust said chart according to the weight of a unit, a load balance having means to adjust said indicating member along the selected series of graduations according to the weight of the load on said load balance, and a unit receptacle connected with said load balance.

40. In a counting scale, a chart having a plurality of series of graduations representing numbers of parts, a load balance comprising a beam and a poise, an indicating member connected with said poise and arranged to cooperate with said chart, a unit balance, means controlled by said unit balance to adjust said chart to bring a selected series of graduations into cooperative relation with said indicating member, and a unit receptacle connected with said load balance.

In testimony whereof, I affix my signature hereto.

WILLIAM R. MITTENDORF.